United States Patent
Lowi, Jr.

[15] 3,635,799
[45] Jan. 18, 1972

[54] PORTABLE STILL WITH CONCENTRIC-VAPORIZING, RESERVOIR AND COLLECTION CHAMBERS

[72] Inventor: Alvin Lowi, Jr., 2146 Toscanni Drive, San Pedro, Calif. 90732

[22] Filed: Jan. 31, 1969

[21] Appl. No.: 795,468

[52] U.S. Cl..............................202/83, 202/187, 202/197, 202/176, 202/185 B, 203/10, 202/202
[51] Int. Cl...................................................B01d 3/00
[58] Field of Search..............202/187, 185, 185.3, 197, 235, 202/83, 202, 175, 176, 178; 203/11, 100, 10

[56] References Cited

UNITED STATES PATENTS

| 1,346,537 | 7/1920 | Flowers | 202/187 |
| 2,025,724 | 12/1935 | Clendenin | 203/11 |
| 2,649,408 | 8/1953 | Williamson et al. | 202/197 |
| 3,050,449 | 8/1962 | Moore | 202/189 |
| 3,347,755 | 10/1967 | Brooks | 202/197 |
| 3,415,721 | 12/1968 | Bie | 203/11 |
| 3,450,602 | 6/1969 | James | 203/11 |
| 3,456,428 | 7/1969 | Bichet et al. | 202/197 |
| 3,082,815 | 3/1963 | Keller | 202/176 |
| 3,458,404 | 7/1969 | Vincent et al. | 202/197 |
| 3,236,746 | 2/1966 | Poindexter et al. | 202/187 |
| 3,278,395 | 10/1966 | Rubinowitz | 202/187 |
| 3,350,279 | 10/1967 | Tolchin | 202/83 |

FOREIGN PATENTS OR APPLICATIONS

| 442,449 | 8/1912 | France | 202/187 |
| 528,145 | 10/1940 | Great Britain | 202/197 |

Primary Examiner—Wilbur L. Bascomb, Jr.
Attorney—Nilsson, Robbins, Wills & Berliner

[57] ABSTRACT

A distillation unit including a vaporizing chamber, a reservoir containing liquid to be distilled and operatively associated with the vaporizing chamber to feed liquid thereto, means for heating the vaporizing chamber liquid to produce a vapor phase thereof, and means for condensing the vapor phase to form a distilled liquid separated from the reservoir liquid. A flue is provided in heat-exchange relation with the vaporizing chamber and means are provided for directing heat to the flue. Means are also provided for rupturing bubbles of vapor produced in the vaporizing chamber.

9 Claims, 5 Drawing Figures

INVENTOR.
ALVIN LOWI, Jr
BY Nilsson & Robbins
Attorneys.

INVENTOR.
ALVIN LOWI, Jr.
BY Nilsson & Robbins
Attorneys.

a foamed lightweight material sandwiched therebetween. The member 36 is highly insulative and its inner surface 41 forms an evaporator housing as more fully detailed hereinafter. The outer surface 36a of the member 36 defines, with the inner surface of the tubular member 37, a reservoir 30 that is insulated by the foamed material of the member 36 from the remaining inner section of the still 10. Water or other fluid is

PORTABLE STILL WITH CONCENTRIC-VAPORIZING, RESERVOIR AND COLLECTION CHAMBERS

BACKGROUND OF THE INVENTION

1. Field of the Invention

The field of art to which the invention pertains includes the field of distillation, particularly with respect to stills therefor.

2. Description of the Prior Art

A truly portable and effective distillation unit is very desirable and could be of critical importance as a lifesaving device. Such a unit must be lightweight and efficient and must produce a large volume of distillate for its size. Complete isolation must be maintained between the source material and the end product since the source material may be contaminated, such as sea water or water-containing detergents, oils, bacteria, minerals, or the like, which would be undesirable. Such a distillation unit could be utilized for camping or on boats for emergency purposes, or in disaster areas to provide a dependable source of pure water and in such use, the unit must be rugged and of simple, easily cleanable parts. Such a distillation unit could also be utilized in laboratories to provide a source of distilled water, or to distill other fluids, such as alcohols. Such a unit can be utilized in the household for the purification of drinking water and to provide water for cooking or for steam irons, or other such devices.

SUMMARY OF THE INVENTION

The present invention provides a simple, efficient, portable distillation unit of simple, easily cleanable parts and which provides a dependable means of obtaining pure water. Complete isolation is provided between the source material to be distilled and the end product. A relatively large amount of distillate can be produced; for example 2 quarts of water can be distilled per hour at 70° F. ambient when utilizing a gasoline-operated camp stove.

In accordance with this invention a distillation unit is provided comprising: means defining a vaporizing chamber for containing liquid to be vaporized thereat; means defining a reservoir for containing liquid to be distilled, the reservoir being operatively associated with the vaporizing chamber to feed liquid thereto; means for heating the vaporizing chamber liquid to produce a vapor phase thereof; and means for condensing the vapor phase to form a distilled liquid separated from the reservoir liquid. In particular embodiments, the heating means comprises a flue in heat-exchange relation with the vaporizing chamber, and means for directing heat into the flue. The vaporizing chamber is formed to produce moving bubbles of vapor upon heating of the liquid therein; means are provided outside the vaporizing chamber liquid but in the path of movement of the bubbles of vapor for rupturing such bubbles into a liquid phase and a vapor phase. In further particular embodiments, a cover is provided for the unit which defines means for transmitting liquid into the reservoir for easy access to the reservoir. By such means, a continuous operation of the still can be effected.

In still further particular embodiments, the flue is provided with a plurality of elongate fins disposed along the length thereof for transferring heat to the vaporizing chamber. A plurality of plugs are disposed in the path defined by the fins for causing turbulence in the fluid flow. The flue extends longitudinally through the vaporizing chamber and exteriorly from the top thereof, and a toroidal coil is disposed on the flue atop the vaporizing chamber to serve as the aforenoted rupturing means.

DESCRIPTION OF THE PREFERRED EMBODIMENTS

Figure 1:
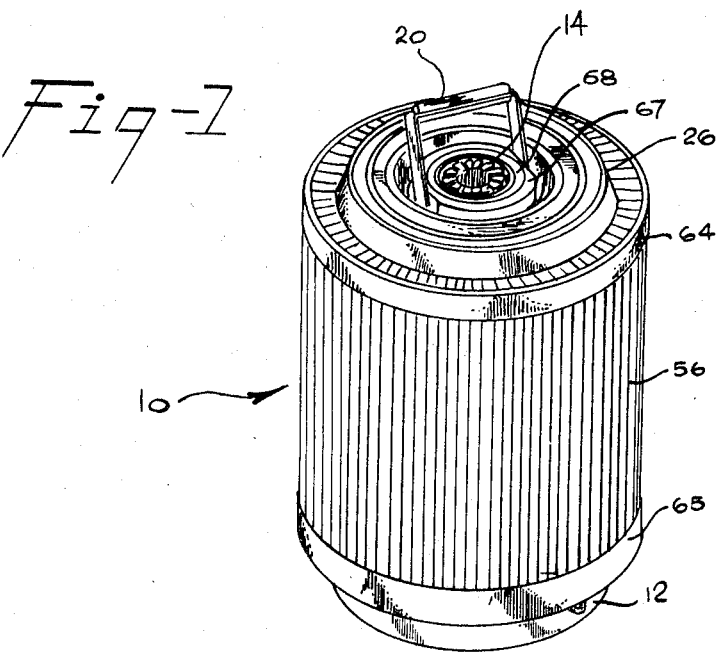
FIG. 1 is a perspective view of a portable still constructed in accordance with this invention.
Figure 2:
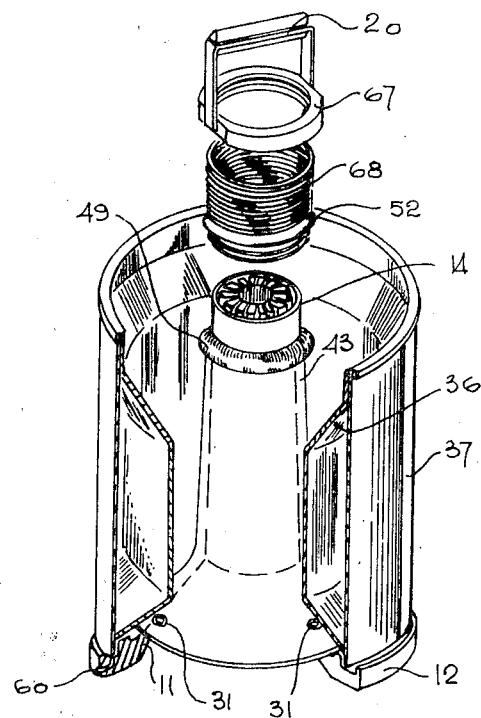
FIG. 2 is a perspective, partially exploded, partially cutaway view of components of the device of FIG. 1 with the finned housing removed.

Referring to FIGS. 1 and 2, the portable still 10 described herein is self-contained and includes a housing of elongate fins 56, a top cover 26 and a handle 20. The components contributing to the general exterior appearance of the still 10 comprise upper and lower retaining rings 64 and 65, respectively, the upper portion of a flue 14, a retaining flue ring 68 and a collar 67, attached to the handle 20. The lower flat annular surface 12 of a conical aluminum member 11 (FIG. 2) also contributes to the appearance of the device when viewed face on and serves as a heat-directing base therefor.

Figure 3:
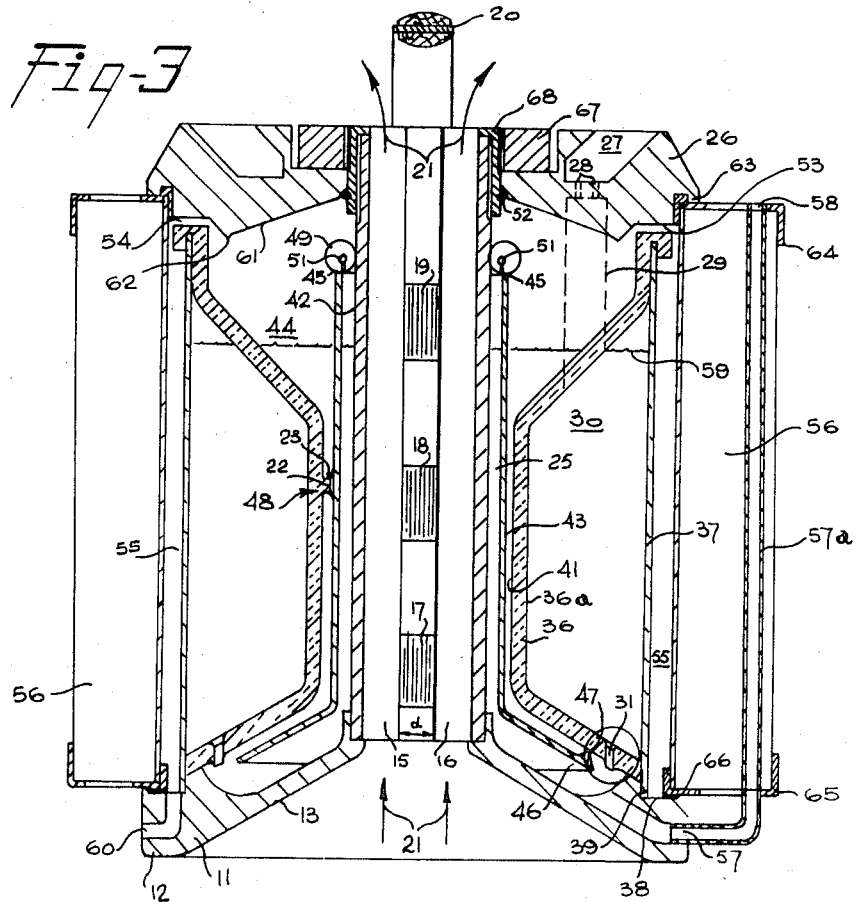
FIG. 3 is a cross-sectional view of the device of FIG. 1.
Figure 4:
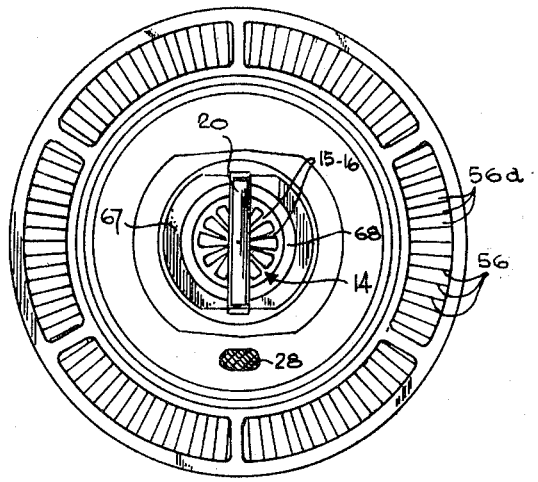
FIG. 4 is a top plan view of the device of FIG. 1.
Figure 5:
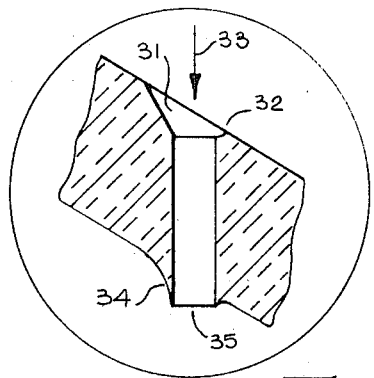
FIG. 5 is a detailed view of a portion of one of the components as depicted in FIG. 3.

Referring to FIG. 2, other components of the still, which will be detailed further with respect to FIGS. 3-5, are depicted in a partially exploded, partially cutaway view of the device, with the fins 56 removed. Thus, the still includes a conical aluminum member 11 (shown partially in shadow), a flue 14 extending therefrom, and a rigid plastic baffle 43 overlying the flue 14 and conical member 11. A tubular aluminum member 37 is disposed on the outer edges of the conical member 11 and extends upwardly therefrom to encircle the flue 14 and baffle 43. A member 36 of foamed plastic defines a reservoir with the inner surface of the tubular aluminum member 37. A toroidal coil spring 49 is disposed atop the baffle 43 for purposes hereinafter described. The flue ring 68 is sealed to the cover 26 by means of an O-ring therearound.

Referring to FIG. 3, an assembly view of the still 10 is illustrated in cross section. The conical metallic member 11, advantageously of aluminum, provides both a base and a portion of a heat input unit. The conical member 11 has a lower flat annular surface 12 which is designed to rest upon a surface from which heat eminates, for example, a hotplate, a gas stove, or the like. The member has a conical inner surface 13 utilized to direct heated gases upwardly toward the flue 14. The flue 14 has a plurality of radially inwardly directed fins, as generally illustrated at 15-16, which do not progress inwardly completely to the center, but rather leave an open area generally shown by the arrow d, and which are more clearly shown in FIG. 4. Inserted within the opening thus provided are a plurality of plugs 17, 18 and 19 of any inert solid material, for example, glass, aluminum, or porcelain. The plurality of plugs 17-19 are utilized to break the continuous inner surfaces of the fins 15-16 and thereby provide turbulence to the flow of gases upwardly through the flue 14. Turbulence, or breakage in the heat flow pattern, is desirable to more efficiently transfer the heat. Turbulence could be obtained by staggering the fins but the provisions of the plugs 17-19 as shown is much more economical of manufacture and very efficient. The gases flow upwardly as indicated by the arrows 21 and exhaust at the top surface of the flue 14 as indicated by the arrows 23. In the process of flowing from the bottom to the top, the heat contained in the gases is transferred through the fins 15-16 and the flue surface 14 into communication with a chamber 25. The chamber 25 is defined by the flue 14 and baffle 43, referred to above, and serves as a vaporizing section as hereinafter detailed.

A tubular, aluminum member 37 fits within a groove 38 which in turn defines a surface 39 on the conical base member 11. The tubular member 37 is brazed or otherwise permanently affixed at its lower edge to the base member surface 39. An inner member 36 is provided which is constructed of a foamed polypropylene plastic material, which is injection molded to provide hard, smooth inner and outer surfaces with a foamed lightweight material sandwiched therebetween. The member 36 is highly insulative and its inner surface 41 forms an evaporator housing as more fully detailed hereinafter. The outer surface 36a of the member 36 defines, with the inner surface of the tubular member 37, a reservoir 30 that is insulated by the foamed material of the member 36 from the remaining inner section of the still 10. Water or other fluid is contained within the reservoir 30 as shown by the waterline 59 and seeks its level in the inner sections of the still.

The cover 26 is utilized to close the upper surface of the fluid-containing portion of the still 10. The cover 26 is provided with a funnel area 27 into which the fluid for distillation can be poured. A plurality of openings, as provided by a screen 28, as shown more clearly in FIG. 4, are disposed at one section within the funnel portion 27 of the cover 26 and operate to permit fluid poured into the funnel area 27 to pass through a tube, shown in shadow 29, into the reservoir 30. The size of the screen openings 28 precludes large foreign particles from entering the reservoir 30. Water, or other fluid to be distilled, contained within the reservoir 30 passes through a plurality of openings 31 defined by the lower portions of the foamed plastic inner member 36, and into the evaporator section of the still. As detailed in FIG. 5, the openings 31 each have a sloped entry way 32 to encourage the flow of fluid downwardly therethrough as indicated by the arrow 33. A lip 34 is provided around the exit 35 so as to preclude easy flow of fluid upwardly or against the direction of the arrow 33. This construction suppresses percolation of fluid upwardly into the reservoir 30 and encourages the flow of fluid downwardly from the reservoir 30.

The inner surface 41 of the foamed plastic member 36 and the outer surface 42 of the flue 14 define an evaporator section for the still. The evaporator section is divided into two areas by the baffle 43 to define a vaporizing section 25 and a downcomer section 44. The baffle 43 is constructed of molded polypropylene, unfoamed plastic, or other appropriate material such as nylon or a metal. The vaporizer section 25 extends from the upper end 45 of the baffle 43 to the lower end 46 thereof. At the lower baffle end 46 there are provided a plurality of protrusions 47 which act as spacers in conjunction with the inner surface 41 of the foamed plastic member 36. In assembly, a mechanism, shown generally at 48 extending from the inner surface 41 of the baffle 43 in place within the unit. Thus, a key 22 projecting from the inner surface 41 of the foamed member 36 is secured within a keyway 23 therefor projecting from the outer surface of the baffle 43 to secure the baffle.

The upper edge 53 of the foamed member 36 is castellated so as to provide a plurality of openings 54 to effect communication between the evaporator chamber 30 and a condensing chamber 55 which is defined by the outer surface of the tubular aluminum member 37 and the inner surfaces of the heat-exchanging fins 56. The condensing chamber 55 is utilized to accomplish condensation of vapor into liquid which passes through an exit 60 at the bottom thereof, through the widened base of the conical member 11, into a desired receptacle. The heat-exchanging fins 56 are more clearly shown in FIG. 4. Spaces 56a are provided between the fins 56 so that air may circulate therethrough in order to provide heat exchange to accomplish the desired condensation.

Referring back to FIG. 3, an opening 57 is defined in a lower portion of the conical member 11, on one side thereof, to communicate with the evaporation chamber 44. Under normal operation of a batch-type, a glass tube 57a is connected at the communication opening 57 and is secured (by means not shown) at the upper end 58 of one of the fins 56 to provide a gauge exteriorly of the still 10 to indicate the amount of fluid contained within the fluid chambers 25, 30 and 44.

The heat-exchanging fins 56 are secured between upper and lower flanged retaining rings 64 and 65, the upper ring 64 being shown more clearly in FIG. 4. The lower retaining ring 65 has its inner periphery provided with a flange secured within the groove 38 on the base of the conical member 11. The cover 26 has an ear 63 defined by its rim which presses downwardly upon the flanged top ring 64. A rubber gasket 66 is positioned at the lower section of the base 11 within the groove 38 thereat and provides a fluid seal for the condensation chamber 55. The pressure to accomplish the seal is provided by a collar 67 attached to the handle 20 and threaded upon a ring 68 that is carried at the upper end of the flue 14.

The collar 67 is turned by means of the handle 20 to lock the cover 26 in place and thereby apply downward pressure to accomplish the sealing against an O-ring 52 between the flue ring 68 and the cover 26, as well as the downward pressure above-referred-to to operate against the gasket 66.

A toroidal coil spring 49 is positioned about the upper portion of the flue 14 and upon the upper end 45 of the baffle 43. The coil 49 is held in place by a plurality of knobs 51 formed integrally with the baffle upper end 45. The coil 49 is pushed into place over the knobs 51 and retained thereby in that position. The coil spring 49 operates to rupture bubbles of vapor rising from the vaporizing section 25 so as to shear entrained liquid therefrom. A screen or apertured plate might be utilized for the same function, and these devices do in fact shear entrained liquid. However, with these devices, a new membrane of liquid is formed closing the apertures so that a pressure differential develops across the membrane to form a new bubble which sprays entrained liquid upon bursting. These effects are minimized with the coil spring 49. Accordingly, utilizing a coil spring 49 as shown provides distinct efficiency advantages.

In operation, water or other fluid to be distilled is poured into the funnel section 27 of the cover 26 and flows via the openings 28 and tube 29, as described, into the reservoir 30. The fluid then seeks its level, indicated at 59 via the reservoir opening 31 into the other fluid chambers 25 and 44. As heated gases are permitted to flow upwardly through the flue 14 as indicated by the arrows 21, heat is transferred into the vaporizer section 25, thus producing bubbles within the liquid contained in the vaporizer section 25. The bubbles flow upwardly through the column of liquid contained therein and as the bubbles thus flow through the liquid, liquid particles are carried therealong. As the bubbles emerge from the upper end 45 of the baffle 43, they contain vapor which has been generated by the heat and liquid which is in the form of a fine spray or mist. As the bubbles then rise and contact the coil 49, the bulk of the liquid which has adhered to the bubbles is sheared by the coil 49 thus leaving principally the vapor, but with some particles of liquid still carried therealong. The bulk of the liquid thus sheared from the vapor immediately falls into the downcover section 44 for recirculation. The finer particles of the liquid that are still carried by the vapor coalesce on the undersurface 61 of the cover 26. A downwardly directed protrusion 62 is provided on the cover undersurface 61 in the vicinity of the downcomer section 44 and serves as a barrier to concentrate the coalescent liquid from the undersurface 61 to cause it to drip into the downcomer section 44. The remaining vapor then passes the protrusion 62 and exits through the opening 54 into the condensation chamber 55. The heat transfer between the vapor in the condensation chamber 55 and the heat-exchanging fins 56 causes condensation of the vapor into a distilled pure liquid which passes through the exit opening 60 at the bottom of the condensation chamber 55 into a receptacle therefor.

In the early phases of operation of the condensation chamber 55, the fluid contained in the reservoir 30 also acts as a heat sink and causes a more efficient and rapid condensation to occur. As this heat-sink operation progresses, the fluid in the reservoir 30 continues to heat up and provides less and less condensation. However, this also results in preheating of the fluid in the vaporizing section 25 to obtain maximum utilization of the overall heat flow through the still.

A still as above described can function to distill 2 quarts of water per hour at 70° F. ambient when utilizing a heat source of approximately 2,5000–3,000 B.t.u., the equivalent of a gasoline-operated camp stove. The portable still described herein is designed to utilize any heat source desired such as charcoal or coals from a campfire, a gas or electric burner, a range that might be found in a home or on a boat or in a camper or trailer, the waste heat from a Coleman lantern, or the like. Isolation is provided between the reservoir 30 and the end product. A natural continuous circulation is provided and the unit can operate either batchwise as has been described, or continuously. If continuous operation is to be performed, a means of continuously applying feed water into the funnel area 27 can be provided and the glass tube 57a above-referred-to can be positioned so that the upper end thereof is at the desired level represented by the waterline 59. In this case, should the amount of feed water exceed that which can be handled by the evaporator section 25, any excess would drip out of the tube 57a into a drain, or as waste.

In the event that a large amount of organic material is contained in feed water to be distilled by the hereindescribed still, a bacteriocide can be added. An antifoaming agent can be added to preclude overloading of the evaporator section 25 as a result of excess detergents, or the like, in the feed water.

What is claimed is:

1. A portable distillation unit, comprising:
   a vertically extended heat-conducting member;
   a first wall vertically around said heat-conducting member defining a vaporizing chamber for containing liquid to be vaporized by heat from said conducting member to produce a vapor phase thereof;
   a second wall vertically around said vaporizing chamber defining a reservoir for containing liquid to be distilled, said reservoir being operatively associated with said vaporizing chamber to feed liquid thereto;
   a third wall vertically around said reservoir defining a collection chamber for distilled liquid;
   a member defining an annular surface extending over said vaporizing chamber and said reservoir, said surface being vertically directed along a region spaced outwardly from said vaporizing chamber and spaced inwardly from said collection chamber for directing liquid entrained with said vapor phase away from said collection chamber; and
   means for condensing said vapor phase to form a distilled liquid in said collection chamber.

2. The unit of claim 1, wherein said heat-conducting member comprises a flue in heat-exchange relation with said vaporizing chamber, and including means for directing heat into said flue.

3. The unit of claim 1, wherein said vaporizing chamber is formed to produce moving bubbles of vapor upon heating of liquid therein; and including means outside said vaporizing chamber liquid but in the path of movement of said bubbles for rupturing said bubbles into a liquid phase and a vapor phase.

4. The unit of claim 1, including a fourth wall between said first and second walls defining a receiving chamber for receiving said directed liquid, said receiving chamber being operatively associated with said vaporizing chamber to recirculate said directed liquid thereto.

5. The unit of claim 1, wherein said condensing means comprises a plurality of heat-exchanging fins vertically around said reservoir.

6. The unit of claim 1, in which said member constitutes a cover for said unit, said cover-defining means for transmitting liquid into said reservoir.

7. The distillation unit of claim 1 wherein said heat-conducting member comprises:
   a vertically extended flue;
   a plurality of inwardly directed fins disposed within said flue along the length of said flue for transferring heat to said vaporizing chamber; and
   means for heating said flue to heat said vaporizing chamber liquid.

8. The unit of claim 6, wherein the inner surfaces of said fins define a path for fluid flow, and including a plurality of plugs disposed in said path for causing turbulence in said fluid flow.

9. The unit of claim 3 wherein said bubble-rupturing means comprises a coil disposed outside said vaporizing chamber liquid but having its turns disposed in the path of movement of said bubbles for rupturing said bubbles into a liquid phase and a vapor phase.

* * * * *

UNITED STATES PATENT OFFICE
CERTIFICATE OF CORRECTION

PATENT NO. : 3,635,799
DATED : January 18, 1972
INVENTOR(S) : Alvin Lowi, Jr.

It is certified that error appears in the above-identified patent and that said Letters Patent are hereby corrected as shown below:

Column 6, line 27, change "6" to --5--.

Signed and Sealed this sixth Day of April 1976

[SEAL]

Attest:

RUTH C. MASON
Attesting Officer

C. MARSHALL DANN
Commissioner of Patents and Trademarks